June 12, 1951 N. CONCORDET 2,556,798

THREE-DIMENSIONAL EXHIBIT

Filed Dec. 22, 1948

INVENTOR.
NOEL CONCORDET

BY Edwin Leinsdorf

ATTORNEY

Patented June 12, 1951 2,556,798

UNITED STATES PATENT OFFICE 2,556,798

THREE-DIMENSIONAL EXHIBIT

Noël Concordet, Washington, D. C., assignor to himself and Solange Cote Concordet, Silver Spring, Md., jointly Application December 22, 1948, Serial No. 66,821

3 Claims. (Cl. 35—41)

This invention relates to three-dimensional maps and other relief exhibits.

The primary object of this invention is to provide a three-dimensional exhibit such as, for example but without limitation, a relief map or drawing or other three-dimensional exhibit of such character that the altitude or level elements are clearly visible throughout the depth of the exhibit.

The above object of the invention and objects ancillary thereto will be fully understood from the following description considered in connection with the accmpanying illustrative drawings.

Figure 1:
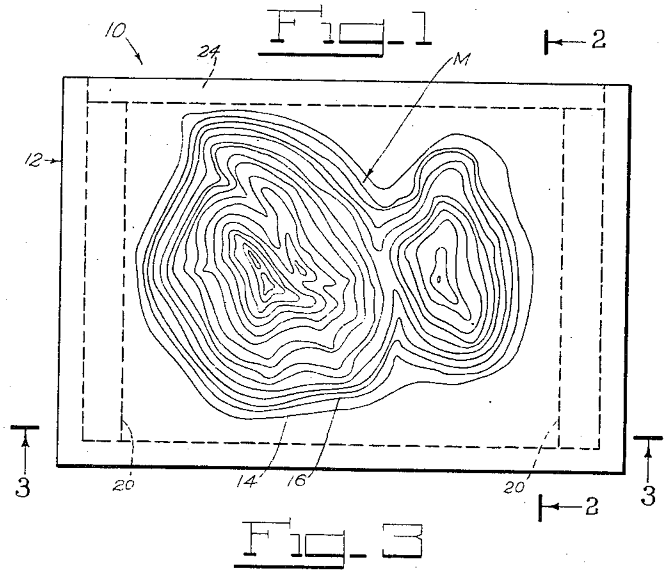
Fig. 1 is a front view of an exhibit embodying the present invention, said exhibit being here shown as a three-dimensional map.
Figure 3:
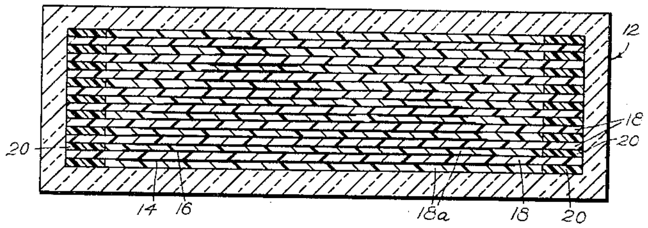
Fig. 3 is a sectional view on the line 3—3 of Fig. 1.
Figure 5:
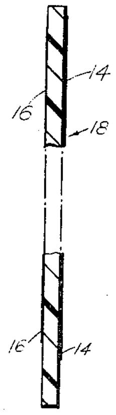
Fig. 5 is a sectional view, on a larger scale, on the line 5—5 of Fig. 4.
Figure 4:
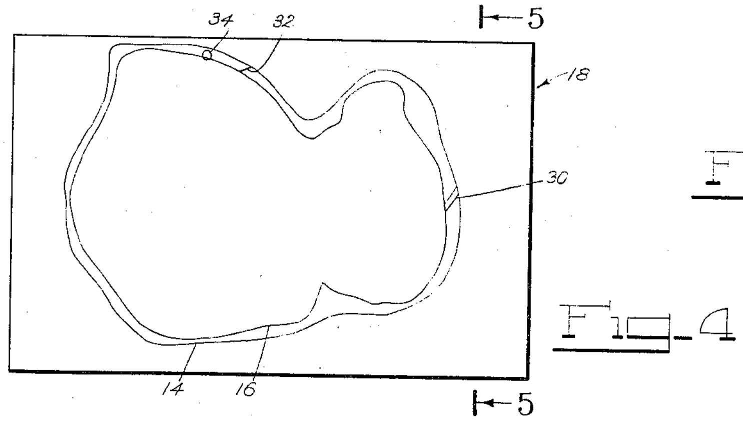
Fig. 4 is a plan view of one of the elements of the exhibit shown in Figs. 1 to 3.

Referring now to the drawings in detail, the three-dimensional map 10 comprises a transparent enclosure 12 which may be formed of glass or of "Lucite" (polymerized methyl methacrylate) or of any other suitable plastic. In Fig. 1, the three-dimensional map M of a selected area is formed by a series of contour lines in a transparent body at the various levels or points of altitude, respectively, of the particular area represented on the map. For example, the lowermost level line or lowest point of altitude represented on the map is indicated by the contour line 14 which as usual is peripherally continuous as in the case of the usual contour line, and the next contour line is indicated at 16. Similarly contour or level lines at correspondingly higher altitudes are shown in Fig. 1, without, however, being designated by reference numerals. It will be understood that the level or contour lines are spaced from each other depthwise or in the direction of altitude uniformly according to a selected scale. This may be accomplished conveniently by printing or otherwise delineating two successive level or contour lines on the opposite surfaces of each of a series of transparent sheets or plates 18 which are disposed in parallel planes one on top of the other in spaced relation. The space between two successive sheets or plates is equal to the thickness of one of the sheets as indicated at 18*a* in Fig. 3. The sheets 18 are spaced from each other in any suitable way as by the spacing strips 20. Sheets 18 and strips 20 are preferably made of "Lucite" or of any other suitable plastic. As shown by Figs. 4 and 5 the depthwise-adjacent level lines are carried by the opposite surfaces of the sheets, although it will be understood that it is within the scope of the present invention to apply a level or contour line or other marking, depending upon the nature of the exhibit, to only one surface of the sheets.

Figure 2:
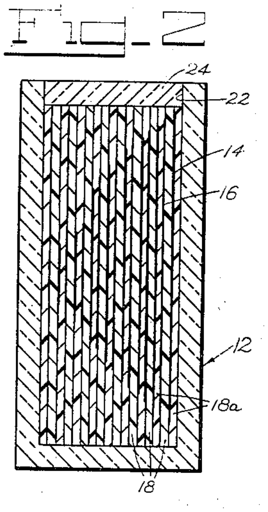
Fig. 2 is a sectional view on the line 2—2 of Fig. 1.

An important feature of the present invention resides in the provision of the contour lines or other markings in a transparent body which is devoid of internal spaces at least within the volume outlined by said markings. When said body includes the spaced plates 18, this is accomplished by filling the spaces 18*a* between the successive sheets or plates 18 with a transparent substance as a result of which a large number of sheets or plates 18 may be provided as may be necessary in order to represent a relief map for an area of high altitude without impairing the visibility of the lower or lowermost level or contour lines. When void spaces are left between the level elements, namely, the sheets or plates 18, the visibility through the assembly or mass constituted by said elements 18, is considerably less, due to light-reflection from the surfaces of said elements, than when the spaces between said elements are filled with transparent material which preferably has an incidence of refraction substantially the same as that of said elements. Said transparent filling material may be water or any other transparent liquid, but since this would require a leakproof enclosure it is preferable that the transparent filling material be solid or sufficiently viscous to obviate the necessity for precautions against leakage. Accordingly, the spaces 18*a* between the level elements 18 are filled with a plastic such as, for example, but without limitation, methyl methacrylate monomer, which is readily polymerized so that the monomer is converted to a solid. It will be understood that after the elements 18 are assembled in spaced relation within the enclosure 12, the transparent liquid may be poured into the enclosure through a suitable opening indicated at 22 in Fig. 2 after which a cover plate 24 formed of "Lucite" or of any other suitable material, preferably transparent, may be applied and secured in position.

Figure 6:
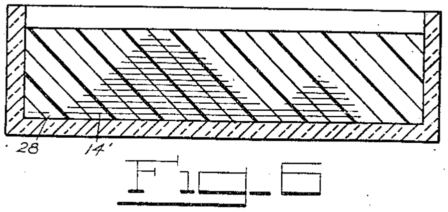
Fig. 6 is a sectional view similar to Fig. 3, showing another form of the invention.

Instead of forming the exhibit from an assembly of individual pre-formed plates or sheets 18, the exhibit may be formed by a series of layers of initially liquid material solidified in situ. For example, referring to Fig. 6, a layer of transparent liquid plastic such as, but without limitation, methyl methacrylate monomer may be cast at the bottom of the container as indicated at 28 and after said layer solidifies the level line indicated at 14' may be printed on the surface of said solidified layer. By casting successive layers of the same thickness one on top of the other after each layer is solidified and after the corresponding level or contour line is applied to the upper surface of the layer before the next layer is cast, a relief map or other exhibit of any desired depth may be formed, as will be readily understood.

The level sheets or cast layers for any one exhibit are preferably uniform in thickness but it will be fully understood that the thickness of the level sheets or plates 18 and of the cast layers 28 may vary with different exhibits, respectively. Also, the different level curves or contour lines or other markings may be printed or applied to the plates or sheets or cast layers, as the case may be, in different colors. Further, in addition to the level or contour lines which are applied to the sheets 18 or to the cast layers 28, various other indicia may be printed or applied thereon, for example, a road as indicated at 30, or a river as indicated at 32, or a city or town as indicated at 34, etc. (Fig. 4).

A three-dimensional map of wide area can be produced in such a way as to show the curvature of the earth. In this case the level or contour lines would not be the conventional level curves but would be delineated to show the earth's curvature. In other words, the level curves at the various levels, respectively, would be corrected for the earth's curvature at the area to be shown by the relief map. On such a map, the seas for example would be illustrated by a series of concentric circles delineated on a series of plates 18 or other level elements of the transparent body, the circles decreasing in radius toward the front of said body.

Various changes may be made in the form and arrangement of the exhibit and parts thereof without departing from the underlying idea or principles of my invention within the scope of the appended claims.

Having thus described my invention, what I claim and desire to secure by Letters Patent, is:

1. A three-dimensional map comprising a transparent body, a series of contour lines disposed in the interior of said body in spaced parallel planes, said lines together forming a substantially continuous three-dimensional contour, said transparent body comprising a series of at least three substantially coextensive transparent plates disposed in spaced parallel planes and having said contour lines thereon, respectively, and a transparent substance filling the spaces between the adjacent surfaces of said plates, respectively, for displacing the air therebetween, said substance having an incidence of refraction substantially equal to that of said plates and being solidified to said adjacent surfaces throughout the extent thereof whereby to eliminate light reflection by said surfaces.

2. A three-dimensional map comprising a transparent body, a series of contour lines disposed in the interior of said body in spaced parallel planes, said lines together forming a substantially continuous three-dimensional contour, said transparent body comprising a series of at least three substantially coextensive transparent plates disposed in spaced parallel planes and having said contour lines thereon, respectively, said plates being in spaced confronting relation, and an initially liquid transparent substance solidified in situ in the spaces between said plates and substantially filling said spaces for eliminating light reflection from the adjacent surfaces of said plates, respectively, whereby said three-dimensional contour is visible from at least one side of said body, said substance having an incidence of refraction substantially equal to that of said plates.

3. A three-dimensional map comprising a transparent body, a series of contour lines disposed in the interior of said body in spaced parallel planes, said lines together forming a substantially continuous three-dimensional contour, said transparent body comprising a series of at least three substantially coextensive transparent plates disposed in spaced parallel planes and having said contour lines thereon, respectively, said plates being substantially equal in thickness, the space between two successive plates being substantially equal to the thickness of one of said plates, and a transparent substance filling the spaces between said plates for displacing the air therebetween, said substance having an incidence of refraction substantially equal to that of said plates and being solidified to the confronting surfaces of said plates throughout the extent thereof for eliminating light reflection by said surfaces whereby said three-dimensional contour is visible therethrough.

NOËL CONCORDET.

REFERENCES CITED

The following references are of record in the file of this patent:

UNITED STATES PATENTS

| Number | Name | Date |
|---|---|---|
| 17,152 | Humphrey | Apr. 28, 1857 |
| 473,901 | Blanther | May 3, 1892 |
| 518,806 | Dillman | Apr. 24, 1894 |
| 666,788 | Aberli | Jan. 29, 1901 |
| 727,140 | Hill et al. | May 5, 1903 |
| 1,490,801 | Collins | Apr. 15, 1924 |
| 1,512,010 | Runcie | Oct. 14, 1924 |
| 1,630,916 | Wittenberg | May 31, 1927 |
| 2,138,024 | Cheesman | Nov. 29, 1938 |
| 2,151,055 | Stark | Mar. 21, 1939 |
| 2,189,592 | Perera | Feb. 6, 1940 |
| 2,252,821 | Thompson | Aug. 19, 1941 |
| 2,291,683 | Boothe, Jr. | Aug. 4, 1942 |
| 2,305,890 | Moore | Dec. 22, 1942 |
| 2,394,282 | Withers | Feb. 5, 1946 |
| 2,486,502 | Spafford | Nov. 1, 1949 |